Feb. 8, 1927.
F. A. HAVLICEK
1,617,110
LIQUID LEVEL INDICATOR
Filed May 11, 1921
2 Sheets-Sheet 1
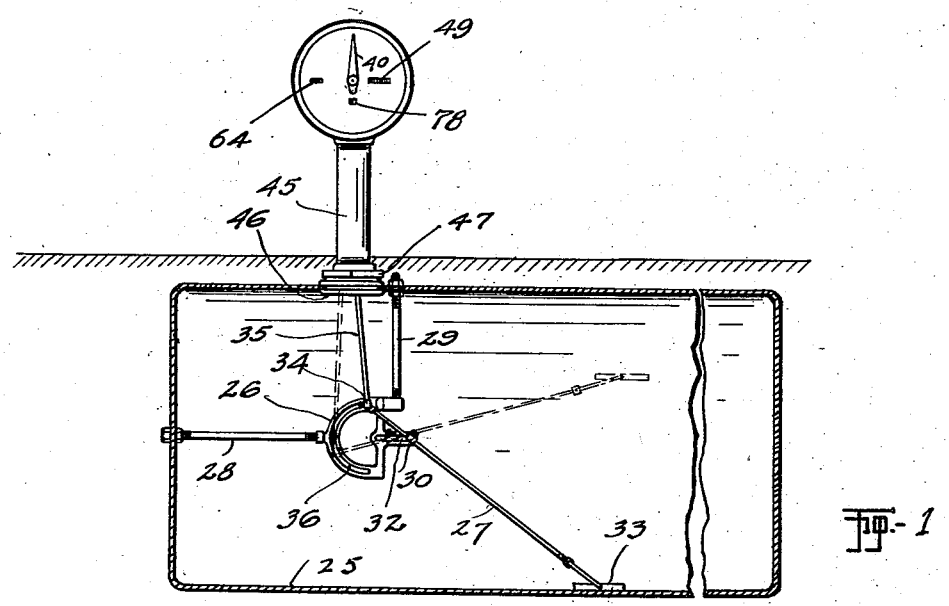
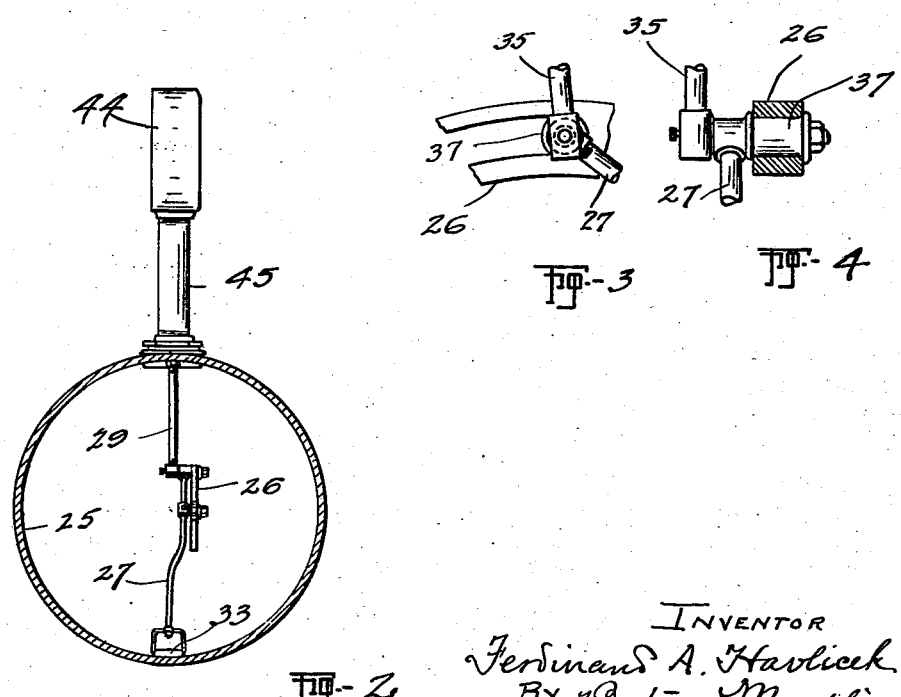
INVENTOR
Ferdinand A. Havlicek
BY Bates & Macklin,
ATTORNEYS.

Feb. 8, 1927.
F. A. HAVLICEK
LIQUID LEVEL INDICATOR
Filed May 11, 1921
1,617,110
2 Sheets-Sheet 2
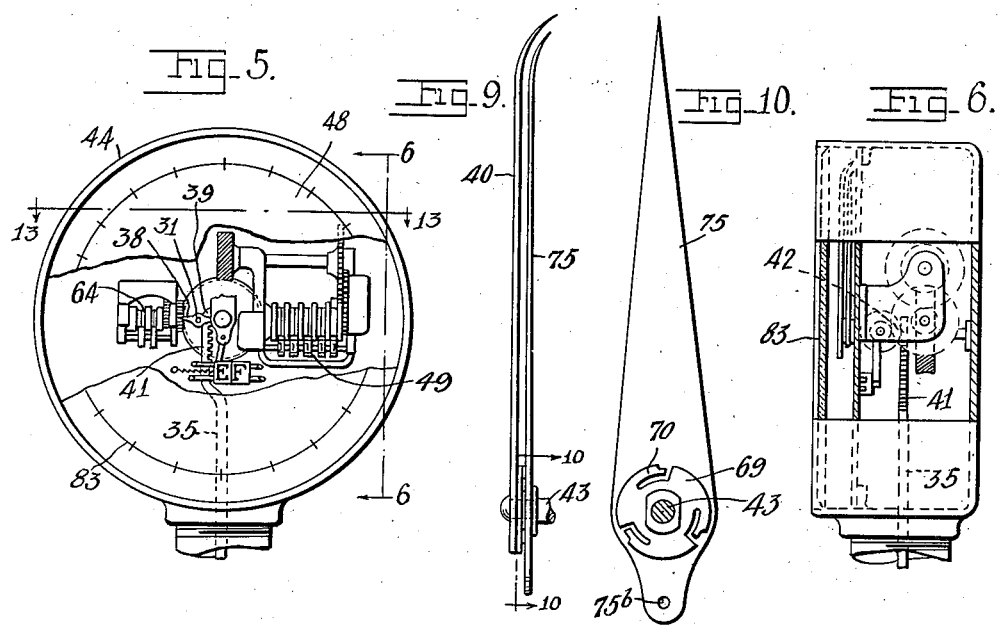
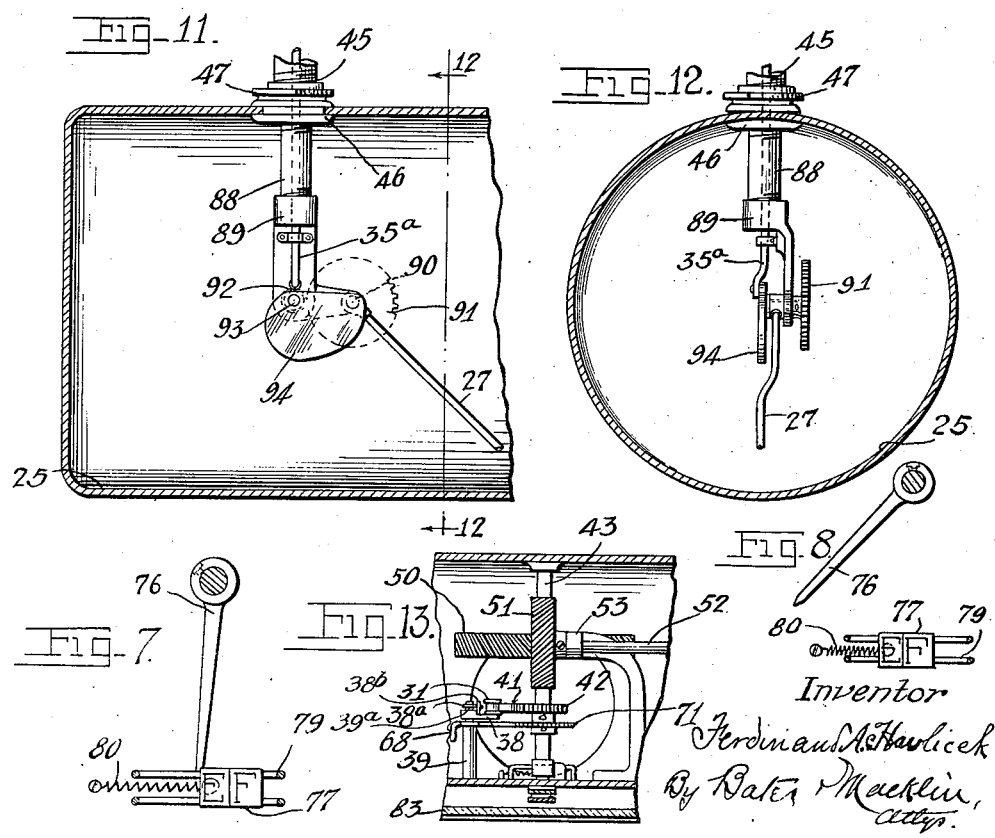
Inventor
Ferdinand A. Havlicek
By Baker & Macklin,
attys.

Patented Feb. 8, 1927.

1,617,110

UNITED STATES PATENT OFFICE.

FERDINAND A. HAVLICEK, OF DILLONVALE, OHIO.

LIQUID-LEVEL INDICATOR.

Application filed May 11, 1921. Serial No. 468,573.

This invention relates to liquid level indicating devices, and is more particularly concerned with the provision of means for indicating the liquid contents of a storage tank.

A great variety of underground storage tanks are in use which are provided with elaborate measuring, gauging and dispensing devices adapted to pump and accurately measure liquid from the tank in exact quantities. This invention is concerned, however, with the provision of gauging mechanism for such a tank which is adapted to indicate the amount of liquid in the tank at all times.

The general object of the invention, therefore, is the provision of novel means for actuating suitable gauging mechanism which is connected with, but may be remotely positioned from, the tank.

More specifically, my invention is concerned with the provision of indicating means actuated by mechanism disposed within a horizontally positioned cylindrical tank, the mechanism in the tank being arranged to compensate for the variable motion of a float consequent to a constant volumetric change of the liquid in the tank whereby a constant movement may be imparted to an indicator, or the like, of a gauge.

Other objects of my invention will be apparent from the following description hereinafter set forth, which refers to the accompanying drawings, the essential characteristics being summarized in the claims.

In the drawings, Fig. 1 is a sectional elevation of a tank positioned beneath the ground line with the gauge mechanism positioned above the ground; Fig. 2 is a transverse section through the tank; Figs. 3 and 4 are detail illustrations of parts of the mechanism shown in Fig. 1. Fig. 5 is a front elevation of the dial with part of the dial face broken away to illustrate the disposition of the mechanism behind the dial face; Fig. 6 is an end sectional elevation substantially along the line 6—6 of Fig. 5; Fig. 7 illustrates an indicator means for indicating when the tank is empty and when it is full of liquid; Fig. 8 illustrates this mechanism in a different position; Fig. 9 is a side elevation of a pair of pointers; Fig. 10 is a transverse section along the line 10—10 of Fig. 9; Fig. 11 is a cross sectional elevation of the tank showing a modified form of mechanism actuated by a float positioned within the tank, Fig. 12 is a transverse section of the tank illustrating an end elevation of the same device, and Fig. 13 is a cross-sectional view taken through the registering mechanism substantially along the line 13—13 of Fig. 5.

I have provided a mechanism that can be conveniently attached to any ordinary cylindrical tank, which will at all times indicate the amount of liquid in the tank.

I find that in order to obtain constant movement of the pointer, it is necessary to have rigid mechanism disposed between the pointer mechanism and an actuating float in the tank. I therefore have arranged a frame 26 within the tank 25 upon which a float lever 27 may be movably mounted. This frame 26 may be conveniently formed of an integral casting adapted to be supported by adjustable spacing rods 28 and 29 rigidly secured to the end and side of the tank.

The motion converting action may be obtained by causing one end of the float lever to follow an arcuate path while the pivotal center of the lever is permitted to shift along a line coincident with the tank axis which is also perpendicular to the chord of the arc of said curved path. Hence I provide a pivot stud 30, for the float lever, which may be arranged to slide in a horizontal slot 32 of the frame 26 as the float 33 raises the lever 27. Since the tank is cylindrical the level of the liquid and consequently the position of the float, will rise and fall variable distances when there is a uniform change in the volume of the liquid. I therefore have provided a bearing block or stud 34 secured to the end of a dial actuating rod 35. This block is restricted to swing along an arcuate slot 36 formed in the member 26. The inner end of the float lever 27 is also pivotally mounted on this block. Hence, as the float 33 shifts the lever 27 about the pivotal center 30, the bearing stud 34 is moved in an arcuate path with a consequent horizontal movement of the lever bearing stud 30 along the slot 32. I am thus enabled to obtain a constant vertical movement of the rod 35 during a variable movement of the float 33. The bearing studs 30 and 34 may be mounted on a roller such as is shown at 37 in Figs. 3 and 4, to reduce the friction between the moving members and the member 26.

When the tank is completely filled the float 33 will be level with the liquid as it is being filled and the rod 35 will thereby be drawn to extreme downward position, and as the level of the liquid in the tank decreases, the float and lever 27 will drop by gravity, thereby raising the rod 35.

To actuate the dial pointer 40 I provide a rack 41 formed on the upper end of the rod 35 which is arranged to mesh with a pinion 42 rigidly secured to a dial staff 43 upon the outer end of which the dial pointer 40 may be rigidly secured. The rack portion of the rod may be maintained in mesh with the pinion 42 by a flanged roller 31, suitably mounted on a spring lever 38 Fig. 13. This lever may be pivotally mounted on a stud 39, rigidly secured to a dial plate 48.

The roller 31 is maintained in contact with the rod 35 by a flexible member 38ª, arranged to bear upon a pin 38ᵇ rigid with the lever 38; the other end of the flexible member being arranged to bear against a lug 39ª, rigidly secured to a stud 39 mounted on the dial plate 48. The circumference of this pinion 42 is equal to the total vertical travel imparted to the rod 35 by the compensating mechanism positioned in the tank.

The housing 44 for the dial may be placed at any convenient height from the tank. Suitable tubing 45 may serve as a standard for the dial casing as well as a vertical housing for the rod. This tubing may be secured to the tank by any convenient means such as a male flange 46 and a female flange 47 which when properly adjusted are adapted to press suitable packing against the wall of the tank to prevent leaks.

At 64 I provide registering discs adapted to show the number of fillings. The discs are actuated by movement of the shaft 43 through the pinion 71 to the pawl 68. To show the total number of gallons put in the tank, I provide the registering discs 49 driven from the shaft 43, gear 50 and 51 and the shaft 52 journalled at 53.

It is frequently desirable to refill the tank when it is only partially empty. The question often arises, however, as to just how much fuel was in the tank before it has been refilled. I therefore have provided an auxiliary pointer 75 that may be moved positively in one direction about the face of the dial by the pointer 40. Hence, as the volume of the liquid in the tank is gradually decreased and the pointer 40 is moved positively about the face of the dial the auxiliary pointer 75 is rotated with it.

I have mounted this auxiliary pointer upon the pointer staff 43, however, in such a manner that when the movement of the pointer 40 is reversed consequent to a refilling of the tank, the auxiliary pointer will remain in the extreme position on the dial to which the pointer 40 has progressed. Hence, as the tank is refilled an the pointer 40 has receded to the proper graduated point corresponding to the volume of the liquid in the refilled tank, the auxiliary pointer will still indicate the amount of liquid that was in the tank before the tank was refilled.

To obtain this result I have secured a spring disc 69 to the inner end of the pointer 75 in such a manner that a series of leaf portions 70 formed in the disc may bear upon the inside surface of the pointer 40. These leaf portions may be arranged to extend in a clockwise direction so that a counterclockwise movement of the pointer 40 will cause the auxiliary pointer to likewise move. If the pointer 40 is moved in a reverse direction, however, the edge of the leaf portions will slide over the surface thereof and the pointer 75 will consequently remain stationary.

The auxiliary pointer may be moved to the radial position of the pointer 40 by removing the transparent shield 83. A pencil or similar article may be inserted in the perforation 75ᵇ to rotate the pointer to the desired position.

In the ordinary dial it is customary to provide a stop pin at the zero position on the dial on either side of which the pointer may rest when the pointer indicates a maximum and minimum reading. I have found that the pointer often becomes angularly displaced with reference to the pointer staff by such an arrangement and have provided other means for determining when the tank is either entirely empty or entirely full, for the empty and full position on the dial is the same, when the stop pin is omitted. I have found that a convenient means of obtaining this result is to arrange a lever 76 rigid with the pointer staff 43 which is adapted to shift an E (empty) and F (full) indicator block 77 into alignment with a suitable aperture 78 formed in the dial plate.

This block may be mounted upon a pair of parallel supporting bars 79, the ends of which may be bent inwardly and be secured to the dial plate 48. A spring member 80 may be suitably arranged to always maintain the block with the proper character registered in front of the opening 78 when any liquid remains in the tank. When the tank becomes completely empty, however, the lever 76 is rotated to an extreme downward position thereby shifting the indicator block until the proper character is registered with the opening 78.

The housing 44 may be formed of any suitable material such as cast brass. The dial plate 48 may be removably secured to the housing by any suitable means.

The operation of the motion converting mechanism shown in Figs. 1 to 4 inclusive is as follows: Assuming that there is a constant volumetric change in the tank the float 33 will be elevated variable distances in a substantially vertical direction. The lever 27 will move about its shifting pivotal mounting 30 along a horizontal path and the pivotal connection 34 thereof will swing about the arcuate slot 36. This deviating movement of the lower end of the rod 35 will bring about a constant movement of the dial for a constant change in volume of the liquid in the tank.

In Figs. 11 and 12 I have illustrated a modified form of compensating mechanism which may be comprised substantially of an adjustable supporting tube 88 secured to the flange member 46. A bearing member 89 may be mounted on the lower end of the tube thereby furnishing bearing means for the float lever 27. This lever may be rigidly secured to a stud 90 upon which a large gear 91 may be mounted. This gear is arranged to mesh with a pinion 92 rigidly secured to one end of a stud 93, while on the other end of the stud I have provided a cam 94 of the proper contour to impart a constant vertical movement to the rod 35ª consequent to a variable movement of the float lever 27.

Having thus described my invention, I claim:

1. In a horizontally disposed cylindrical tank having a frame, the combination of a dial mounted on the frame, a pointer associated with the dial and arranged to indicate the volume of liquid in the tank, a float in the tank, a one piece float lever therefor swingable in a median plane of the tank, a rigid frame within the tank, means including a slotted portion of the frame pivotally supporting the lever at one point, other means including a second slotted portion of the frame slidably supporting said float lever at another point, said portions being spaced apart longitudinally of the lever, a member associated with the pointer and pivotally connected to one end of the float lever, said first named supporting means comprising a member slidably mounted in the first mentioned slotted portion of the rigid frame and pivotally attached to the lever.

2. In a horizontally cylindrical tank having a dial frame and a dial therein, the combination of a pointer cooperating with the dial to indicate the liquid contents of the tank, a float in the tank, mechanism associated with the float to operate said pointer, said mechanism including a rigid frame secured to the walls of the tank and having two slots therein, one being arcuate and the other straight, the latter being perpendicular to a chord of the arc, a float lever, a pair of sliding pivots each adapted to slide in one of said slots, the end and an intermediate portion of the lever being connected to said sliding pivots.

3. A horizontally disposed cylindrical tank, an indicator therefor to indicate the contents of the tank, a float disposed to move in a median vertical plane of the tank, a float lever and a motion converting mechanism for imparting a constant movement to the indicator when actuated by a variable movement of the float, said motion converting mechanism comprising a frame rigidly secured to the walls of the tank and having a curved slot and a straight slot normal thereto, and pivotal connections between the lever and frame, one being located at the end of the lever and adapted to follow the curved slot, the other being located at an intermediate portion of the lever and adapted to follow the straight slot.

4. A horizontally disposed cylindrical tank having a dial and a pointer associated with the dial, in combination with a float disposed within the tank, a float lever, a motion converting mechanism disposed between the float lever and said pointer whereby a variable movement of the float lever consequent to a variable movement of the float imparts a constant movement to said pointer, said mechanism comprising a rigid frame, having a vertically arranged arcuate slot and a straight horizontal slot, means adapted to move in said arcuate slot, an upwardly extending member adapted to actuate said pointer and pivotally engage said means, the end of said lever also being pivotally connected to said means, a slidable pivot block pivotally connected to an intermediate portion of the float lever and adapted to move in the horizontal slot, said frame being arranged to guide said intermediate portion of the lever along a horizontal path when the ends of the lever and member thereof move in an arcuate path.

In testimony whereof, I hereunto affix my signature.

FERDINAND A. HAVLICEK.